US005926278A

United States Patent [19]
Asai

[11] Patent Number: 5,926,278
[45] Date of Patent: Jul. 20, 1999

[54] METHOD OF TAKING IMAGE OF GLOSSY CONVEX PROJECTION, METHOD OF DETERMINING POSITION OF THE PROJECTION, AND SYSTEM FOR TAKING IMAGE OF THE PROJECTION

[75] Inventor: Koichi Asai, Nagoya, Japan

[73] Assignee: Fuji Machine Mgf. Co., Ltd., Chiryu, Japan

[21] Appl. No.: 08/986,628

[22] Filed: Dec. 8, 1997

[30] Foreign Application Priority Data

Dec. 19, 1996 [JP] Japan .................................... 8-339696

[51] Int. Cl.[6] ...................................................... G01B 11/00

[52] U.S. Cl. ........................ 356/376; 356/237.5; 356/375; 348/126; 382/151

[58] Field of Search .................................... 356/237, 394, 356/375, 376, 237.1, 237.5; 348/87, 92, 125, 126; 382/152, 145, 146, 147, 149, 150, 151

[56] References Cited

U.S. PATENT DOCUMENTS

| | | | |
|---|---|---|---|
| 4,803,871 | 2/1989 | Harada et al. | 356/376 |
| 5,245,671 | 9/1993 | Kobayashi et al. | 356/237 |
| 5,267,217 | 11/1993 | Tokura et al. | 356/237 |
| 5,450,206 | 9/1995 | Caillat et al. | 356/394 |
| 5,465,152 | 11/1995 | Bilodeau et al. | 356/237 |
| 5,576,828 | 11/1996 | Tomiyama et al. | 356/376 |
| 5,621,530 | 4/1997 | Marrable, Jr. | 356/237 |

*Primary Examiner*—Hoa Q. Pham
*Attorney, Agent, or Firm*—Oliff & Berridge, PLC

[57] ABSTRACT

A method of taking an image of a convex projection which projects from a plane and whose outer surface has a gloss, including the step of emitting, toward the outer surface of the convex projection, a plurality of lights in a plurality of directions, respectively, which differ from each other as viewed in a direction perpendicular to the plane, so that a plurality of base portions of the outer surface of the convex projection which face the plurality of lights, respectively, and each of which is adjacent to the plane are lighter than a remaining portion of the outer surface as viewed in the direction perpendicular to the plane, and the step of taking, using an image taking device, the image of the convex projection as viewed in the direction perpendicular to the plane.

17 Claims, 5 Drawing Sheets

METHOD OF TAKING IMAGE OF GLOSSY CONVEX PROJECTION, METHOD OF DETERMINING POSITION OF THE PROJECTION, AND SYSTEM FOR TAKING IMAGE OF THE PROJECTION

BACKGROUND OF THE INVENTION

1. Field of the Invention

The present invention relates to the art of taking an image of a glossy convex or part-spherical projection, such as a solder ball of a flip chip or a reference mark of a printed circuit board, which projects from a plane, such as a surface of the flip chip or the circuit board.

2. Related Art Statement

Generally, solder balls of a flip chip or reference marks of a printed circuit board ("PCB") are made of solder in the form of a projection having a part-spherical shape smaller than a hemi-spherical shape, or a shape approximate to the part-spherical shape (hereinafter, generally referred to as the "convex" projection). A flip chip has a number of solder balls located at a number of grid points on its back surface, that is, "a grid array of solder balls". A PCB has reference marks or "solder bulged spots" located in its corners.

When a flip chip is mounted on a circuit substrate, first, the flip chip is held by a component holder such as a suction nozzle, and is conveyed by the same to above a flip-flop-mounting place on the circuit substrate. Subsequently, the component holder and/or the circuit substrate are moved toward each other, for mounting the flip chip on the circuit substrate. It is desirable that the flip chip be mounted at an accurate position on the circuit substrate. To this end, it has been practiced that the image of the grid array of solder balls of the flip chip held by the component holder is taken by an image taking device, position errors of the flip chip held by the component holder are calculated based on the taken image, and the component holder and/or the circuit substrate are positioned relative to each other for eliminating the calculated errors.

In order that a circuit component is mounted at an accurate position on a PCB, it is desirable not only that position errors of the circuit component held by a component holder be measured and corrected but also that position errors of the PCB positioned by a positioning device be measured and corrected. To this end, it has been practiced that reference marks are provided on the PCB, the images of the reference marks are taken, and the position errors of the PCB are measured based on the taken images.

However, it is not easy to take the image of a solder ball or a reference mark, because the solder ball or the reference mark is formed of solder and accordingly the outer surface thereof has a gloss. When the solder ball or the reference mark is exposed to light, it is likely that some part of the solder ball or the reference mark intensely reflects the light. Thus, it is difficult to take a clear image of the contour or profile of the solder ball or the reference mark. To solve this problem, it has been a demand for the art of irradiating, as uniformly as possible, the whole surface of a solder ball or a reference mark. However, no satisfactory solution has been obtained.

The above discussion has been made for the art of taking the image of a solder ball or a reference mark by way of example. This is also the case with the art of taking the images of other glossy convex projections.

SUMMARY OF THE INVENTION

It is therefore an object of the present invention to provide a method and a system for taking a clear image of the contour of a convex projection which projects from a plane and has a gloss.

The present invention provides an image taking method, a convex-projection-position determining method, a circuit-component-holding-position determining method, and an image taking system which have one or more of the technical features which are described below in respective paragraphs given parenthesized sequential numbers (1) to (17). Any technical feature which includes another technical feature shall do so by referring, at the beginning, to the parenthesized sequential number give to that technical feature. Thus, two or more of the following technical features may be combined, if appropriate. Each technical feature may be accompanied by a supplemental explanation, as needed.

(1) According to a first feature of the present invention, there is provided a method of taking an image of a convex projection which projects from a plane and whose outer surface has a gloss, comprising the steps of emitting, toward the outer surface of the convex projection, a plurality of lights in a plurality of directions, respectively, which differ from each other as viewed in a direction perpendicular to the plane, so that a plurality of base portions of the outer surface of the convex projection which face the plurality of lights, respectively, and each of which is adjacent to the plane are lighter than a remaining portion of the outer surface as viewed in the direction perpendicular to the plane, and taking, using an image taking device, the image of the convex projection as viewed in the direction perpendicular to the plane. When the convex projection is lighted in this manner, the image of the convex projection is taken which includes the light or bright base portions of the outer surface thereof which face the plurality of lights, respectively. That is, the image of the remaining portion (i.e., central or top portion) of the outer surface of the convey projection, and the plane from which the convex projection projects are darker than that of the base portions. Based on the images of the light base portions, the contour of the convex projection can be specified or identified with accuracy. In other words, according to the present invention, the plurality of directions in which the plurality of lights are emitted toward the convex projection are so determined as to assure that the contour of the convex projection can be identified with accuracy based on the taken image of the convex projection. For example, in the case where at least three lights are emitted toward the convex projection in at least three directions, respectively, each of which passes through the axis line of the convex projection and a corresponding one of at least three points which equally divide a circle whose center rides on the axis line, the image of the convex projection is taken which includes at least three base portions of the outer surface of the convex projection which is clearly distinguishable from the remaining portion of the same. Thus, the outer peripheral edge line (i.e., bottom line) of the convex projection can be determined with accuracy. In the case where the convex projection is exposed to the lights radially inwardly emitted from an annular light source which concentrically surrounds the convex projection, it can be said that the number of the directions in which the lights are emitted toward the convex projection is infinite. In the case where the sphericity of the convex projection is high, the contour of the convex projection can be determined with accuracy based on the images of two diametrically opposite base portions of the outer surface thereof which are taken by emitting two lights toward the same in two opposite directions, respectively, as viewed in a direction parallel to the axis line of the convex projection. However, generally, the sphericity of the convex projection is not so high. Hence, it is desirable that three or more lights are emitted toward the convex projection in three or more directions, respectively.

(2) According to a second feature of the present invention which includes the first feature (1), each of the plurality of directions is inclined with respect to the plane.

(3) According to a third feature of the present invention which includes the first feature (1), each of the plurality of directions is parallel to the plane.

(4) According to a fourth feature of the present invention which includes any one of the first to third features (1) to (3), the plane comprises a surface of a member of an electric circuit, and wherein the convex projection comprises a solder projection which is formed on the surface of the member. The electric-circuit member may be a flip chip as a circuit component, or a PCB as a circuit substrate, and the convex projection may be a solder ball of the flip chip, or a reference mark of the PCB. As discussed previously, it is strongly required to take an image of a solder ball or a reference mark so that the outer peripheral edge line thereof can be determined with accuracy based on the taken image. This requirement is satisfied according to the present feature.

(5) According to a fifth feature of the present invention which includes the fourth feature (4), the member of the electric circuit comprises a circuit substrate, and the solder projection comprises at least one reference mark formed on a surface of the circuit substrate.

(6) According to a sixth feature of the present invention which includes any one of the first to fifth features (1) to (5), a plurality of the convex projections are formed on the plane such that the convex projections are separate from each other, wherein each of the plurality of lights comprises parallel rays, wherein the step of emitting the plurality of lights comprises simultaneously emitting the plurality of lights each of which comprises the parallel rays, toward at least two convex projections of the plurality of convex projections, and wherein the step of taking the image of the convex projection comprises taking respective images of the at least two convex projections. Either all, or some, of the plurality of convex projections may be simultaneously lighted and imaged. In the latter case, all the images of the plurality of convex projections may be taken by repeating taking the image of each of respective portions of the plurality of convex projections. However, if a certain purpose is achieved based on the image of a certain portion of the plurality of convex projections, it is not needed to take the image of the remaining portion of the plurality of convex projections. In either case, since it is not needed to take the images of the plurality of convex projections, one by one, those images can be taken with improved efficiency. The plurality of convex projections may be simultaneously lighted by one or more lighting devices.

(7) According to a seventh feature of the present invention which includes the sixth feature (6), the plurality of convex projections are formed at a plurality of grid points, respectively, which are defined as points of intersection at which a first group of straight parallel lines and a second group of straight parallel lines perpendicularly intersect each other on the plane, and each of the plurality of directions is inclined with respect to the straight parallel lines of each of the first and second groups as viewed in the direction perpendicular to the plane. This method easily prevents the occurrence of such an event that one of the plurality of projections may shed its shadow on the outer surface of its adjacent convex projection, thereby interfering with taking the image of the adjacent projection.

(8) According to an eighth feature of the present invention which includes the sixth or seventh feature (6) or (7), the each of the plurality of directions is inclined with respect to the plane by a pre-selected angle which does not cause each one of the at least two convex projections to shed a shadow thereof on the outer surface of the other convex projection.

(9) According to a ninth feature of the present invention which includes any one of the sixth to eighth features (6) to (8), the plurality of convex projections comprises a grid array of solder balls formed on a back surface of a flip chip.

(10) According to a tenth feature of the present invention, there is provided a method of determining a position of the convex projection in a direction parallel to the plane, based on the image of the convex projection taken by the method according to the first feature (1). Since the image of the convex projection taken by the method according to the first feature (1) suffices for identifying with accuracy the contour of the same, a position of the convex projection in a direction parallel to the plane from which the same projects can be determined with accuracy based on the image of the same. The position of the convex projection may be a position thereof in an X direction parallel to the plane, or in a Y direction perpendicular to the X direction, or both of the X-direction and Y-direction positions.

(11) According to an eleventh feature of the present invention, there is provided a method of determining, based on the position of the convex projection determined by the method according to the tenth feature (10), a position where a circuit component having the convex projection is held by a suction nozzle.

(12) According to a twelfth feature of the present invention, there is provided a system for taking an image of a convex projection which projects from a plane and whose outer surface has a gloss, comprising a lighting device which emits, toward the outer surface of the convex projection, a plurality of lights in a plurality of directions, respectively, which differ from each other as viewed in a direction perpendicular to the plane, so that each of the plurality of lights is reflected perpendicularly with respect to the plane by a corresponding one of a plurality of base portions of the outer surface of the convex projection which face the plurality of lights, respectively, and each of which is adjacent to the plane, and an image taking device which takes the image of the convex projection as viewed in the direction perpendicular to the plane. When the convex projection is lighted by the lighting device, the base portions of the outer surface of the convex projection which face the plurality of lights, respectively, and each of which is adjacent to the plane are lighter than a remaining portion of the outer surface as viewed in the direction perpendicular to the plane. Therefore, if the image of the convex projection as viewed in the direction perpendicular to the plane is taken by the image taking device, the image of the convex projection includes the outer peripheral edge line of the outer surface of the convex projection which is clearly distinguishable from the remaining portion of the same.

(13) According to a thirteenth feature of the present invention which includes the twelfth feature (12), each of the plurality of directions is inclined with respect to the plane by an angle which assures that the each light is reflected perpendicularly with respect to the plane by the corresponding one base portion of the outer surface of the convex projection.

(14) According to a fourteenth feature of the present invention which includes the twelfth feature (12), each of the plurality of directions is parallel to the plane, so that the each light is reflected perpendicularly with respect to the plane by the corresponding one base portion of the outer surface of the convex projection.

(15) According to a fifteenth feature of the present invention which includes any one of the twelfth to fourteenth features (12) to (14), the lighting device comprises at least three flat-light-flux emitters each of which emits a flat light flux comprising parallel rays and which are provided around a normal of the plane such that each of the flat-light-flux emitters is inclined with respect to the plane. Each of the flat-light-flux emitters may be one which includes a light-guide tube having a rectangular cross section and having a slit provided in the vicinity of an outlet thereof and which emits, via the slit, substantially parallel rays only; one which includes a linear light source and a reflector for reflecting, and thereby converting, the rays radially emitted from the light source into parallel rays; one which includes a linear light source and a linear lens for converting the rays radially emitted from the light source into parallel rays; or one which includes a linear light source, at least one of the above-described lens and the above-described reflector, and a light-guide tube having a slit provided at an outlet thereof. It is preferred that the three or more flat-light-flux emitters be positioned around the convex projection such that they are equiangularly, or approximately equiangularly, spaced from one another about the axis line of the convex projection.

(16) According to a sixteenth feature of the present invention which includes the fifteenth feature (15), the lighting device comprises four flat-light-flux emitters.

(17) According to a seventeenth feature of the present invention which includes any one of the twelfth to sixteenth features (12) to (16), the lighting device comprises a conical-tubular-light-flux emitter which emits a conical-tubular light flux which is delimited by a first cone whose center line is perpendicular to the plane and by a second cone parallel to the first cone, the conical-tubular light flux comprising a plurality of rays parallel to a plurality of generators of the first cone, respectively. The conical-tubular-light-flux emitter may be one which includes a ring light and a reflector for reflecting the rays emitted from the ring light into a substantially conical-tubular light flux. It is preferred that the ring and the reflector be combined with a conical-tubular light guide which may most preferably have a circular slit provided in the vicinity of an outlet thereof.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which.

DETAILED DESCRIPTION OF THE PREFERRED EMBODIMENTS

Referring first to FIGS. 1 to 5, there will be described an image taking system 44 to which the present invention is applied.

Figure 1:
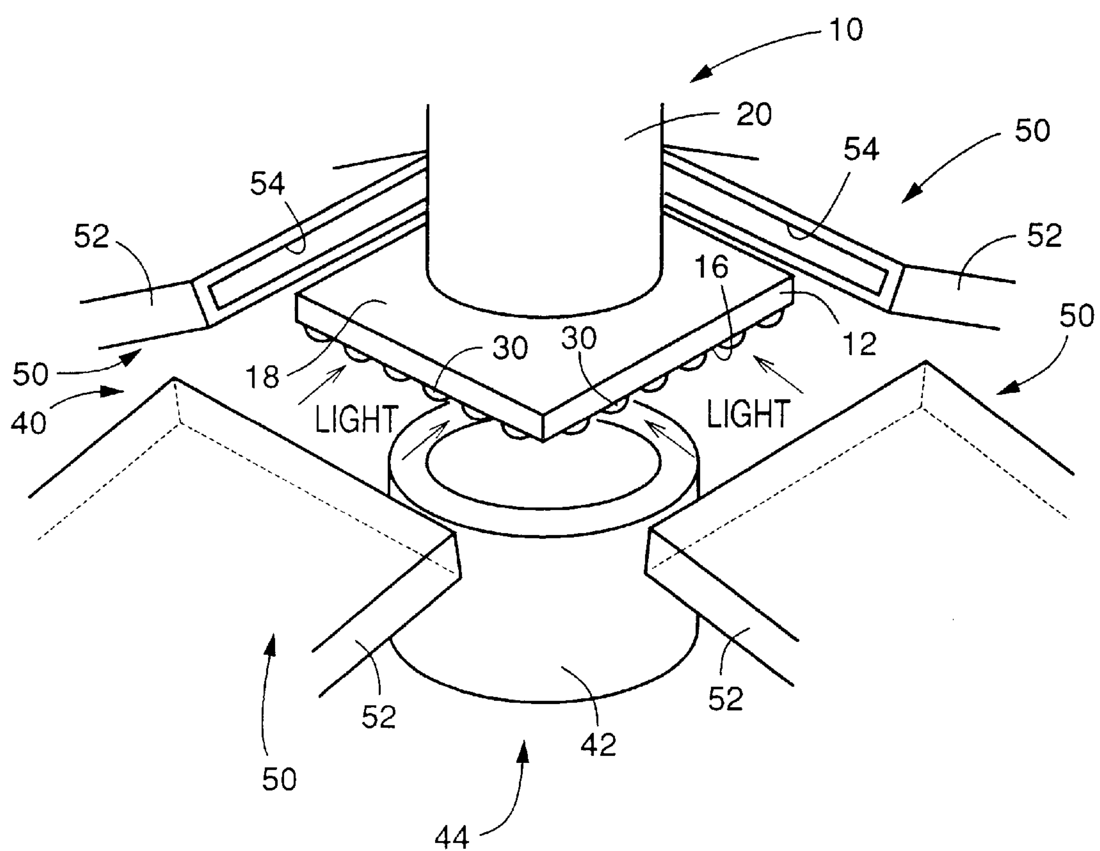
FIG. 1 is a perspective view of an image taking system as a first embodiment of the present invention.
Figure 2:
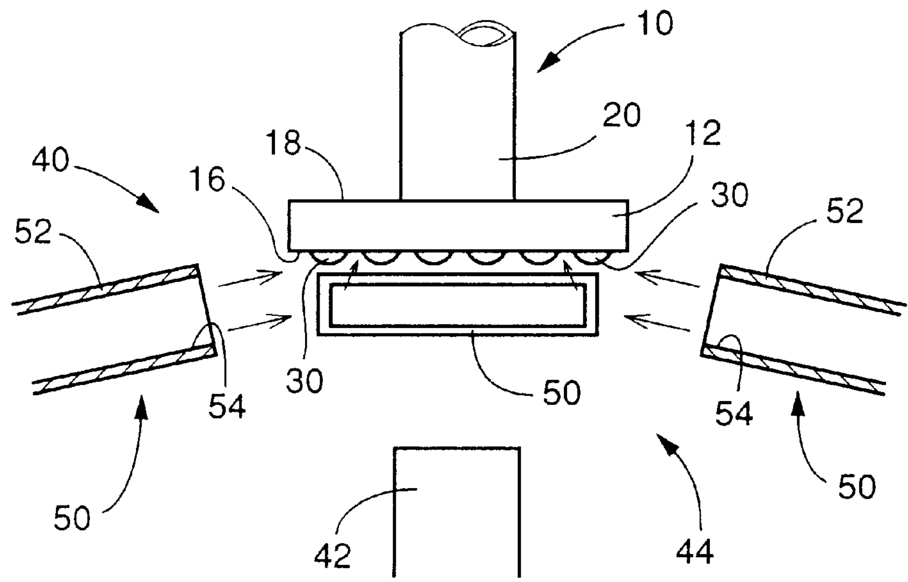
FIG. 2 is a partly cross-sectioned, front elevation view of the image taking system of FIG. 1.

In FIG. 1, reference numeral 10 designates a suction nozzle of an electronic-component ("EC") holding device which takes an electronic component or EC 12 as a member of an electric circuit from an EC supplying device (not shown) and mounts the EC 12 on a printed circuit board ("PCB", not shown) as a circuit substrate. The EC 12 is temporally fixed to the PCB with a solder paste or flux which has already been applied thereto. The suction nozzle 10 is adapted to suck, by vacuum, one surface 18 of the EC 12 opposite to the other surface 16 thereof as a plane which is fixed to the PCB.

The construction of the EC holding device, known in the art, will be described below in short, and the illustration thereof is omitted. The EC holding device includes a movable member which is movable in an X direction and a Y direction which are perpendicular to each other in a horizontal plane. The movable member is driven by a servomotor or the like, so that it can be highly accurately positioned at any desired position in the horizontal plane. The movable member supports an elevating and lowering member which can be elevated and lowered by a drive device. The elevating and lowering member holds an EC mounting head such that the EC mounting head is rotatable about its vertical axis line. The EC mounting head includes the suction nozzle 10. In the present embodiment, the EC 12 is held by the suction nozzle 10 such that the EC 12 takes a horizontal attitude, and is mounted on the PCB which is supported by a PCB supporting device such that the PCB takes a horizontal attitude. Thus, the surface 16 of the EC 12 is a horizontal plane, and a direction perpendicular to the surface 16 is a vertical direction.

The suction nozzle 10 includes a base member (not shown) and a suction pipe 20 which is fitted in the base member such that the suction pipe 20 is movable in its axial direction. The suction pipe 20 is connected to a vacuum source (not shown) via a passage formed in the base member, and a rotary valve, a hose, and a solenoid-operated switch valve (both not shown). The vacuum is supplied to, and cut off from, the suction pipe 20 by the switching of the solenoid-operated switch valve.

Figure 3:
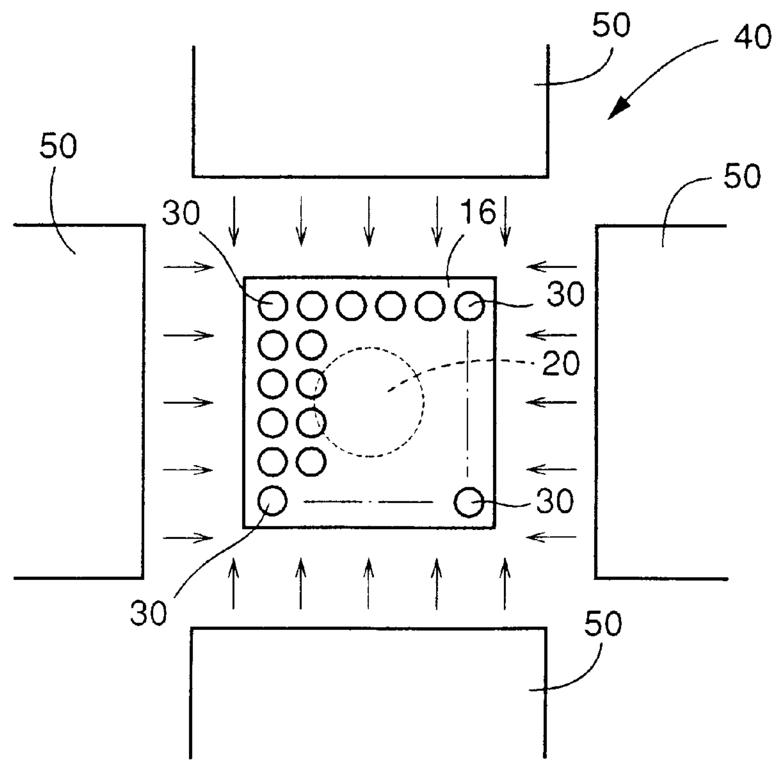
FIG. 3 is view of the image taking system of FIG. 1.

The EC 12 has a parallelopiped shape, and has a plurality of electrodes exposed on the surface 16. A number of solder balls 30 as glossy part-spherical or convex projections are formed on the electrodes of the EC 12. The EC 12 is a flip chip. Each solder ball 30 has a substantially hemi-spherical shape. As shown in FIG. 3, the solder balls 30 are formed at a number of grid points, respectively, that are points of intersection of a first group of straight parallel lines and a second group of straight parallel lines which perpendicularly intersect each other on the surface 16. Thus, the solder balls 30 are provided as a grid array of solder balls. The solder balls 30 are bonded to the solder on the PCB.

A lighting device 40 which emits lights toward the solder balls 30, and an image taking device 42 which takes the images of the solder balls 30 are provided on one side of the EC 12 which is opposite to the other side thereof on which the suction nozzle 10 is provided. The image taking device 42 is controlled by a control device (not shown) including a microcomputer. The lighting device 40, the image taking device 42, and the control device cooperate with one another to provide the image taking system 44. The image taking device 42 is provided by a CCD (charge-coupled device) camera which is equipped with a lens system and solid-state image-pick-up elements. With the suction pipe 20 being positioned right above the image taking device 42, the image taking device 42 is opposed to the EC 12 held by the suction pipe 20. Thus, the image taking device 42 can take the images of the solder balls 30 as viewed in a direction perpendicular to the surface 16 of the EC 12.

The lighting device 40 includes a plurality of light-flux emitters 50 (four emitters 50 in the illustrated example). As shown in FIG. 3, the four light-flux emitters 50 are provided around the suction pipe 20 such that the four emitters 50 are equiangularly spaced from one another by a regularly spacing angle of 90 degrees about the center or axis line of the suction pipe 20 and such that each of the four emitters 50 is oriented toward the EC 12 held by the suction pipe 20. That is, the four emitters 50 are equiangularly spaced from one another about a normal of the surface 16 of the EC 12. Each of the four emitters 50 is inclined with respect to the surface 16 by a predetermined angle which will be described later.

Figure 5:
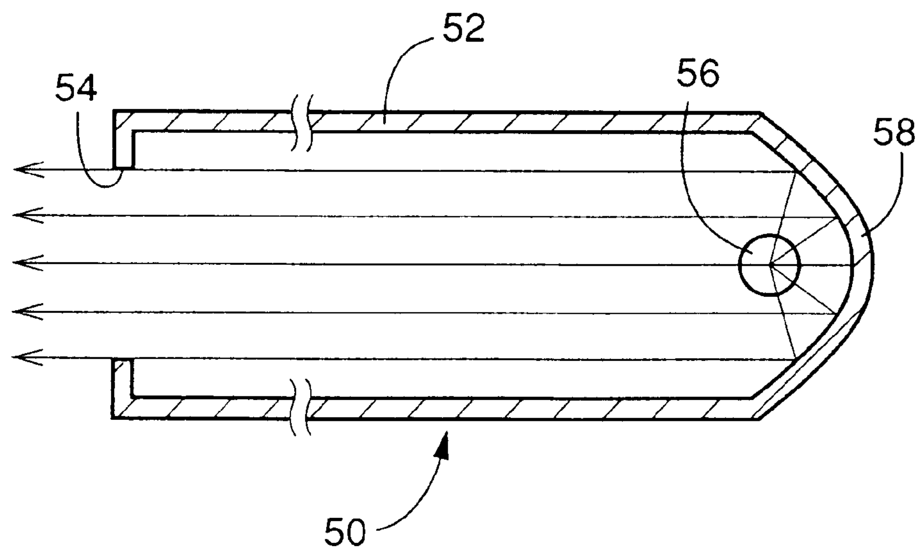
FIG. 5 is a cross-sectioned, front elevation view of an essential portion of a lighting device of the image taking system of FIG. 1.

As shown in FIG. 5, each of the light-flux emitters 50 includes a flat light-guide tube 52 which has a rectangular cross section, whose inner surfaces have a low reflectance, and which has a slit 54 formed in the vicinity of an outlet thereof. A linear light source 56 is provided in the light-guide tube 52, and a concave reflector 58 is provided at one end of the tube 52 which is opposite to the outlet thereof. Accordingly, a portion of the rays radially emitted by the linear light source 56 is reflected by the reflector, and converted into parallel rays, which pass through the slit 54 and then are incident to the EC 12. In addition, another portion of the rays emitted from the light source 56 is directly incident to the EC 12 via the slit 54. In the present embodiment, the light-flux emitters 50 provide flat-light-flux emitters.

Figure 4:
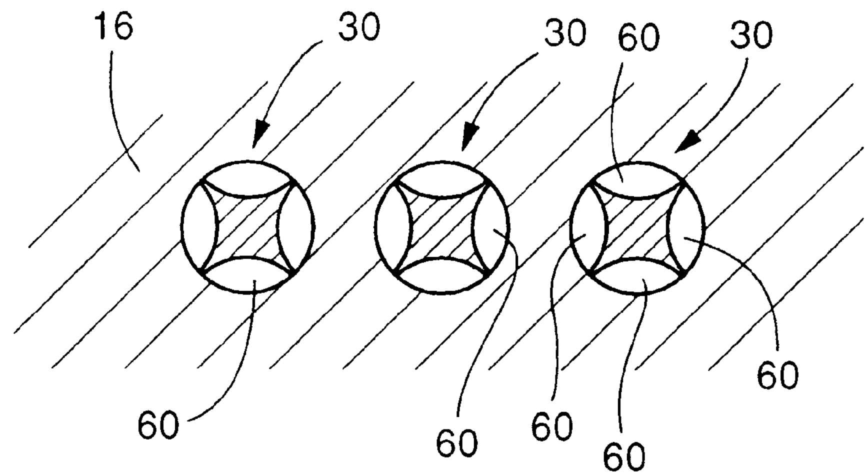
FIG. 4 is a plan view of part-spherical projections whose images are taken by the image taking system of FIG. 1.

An angle at which each of the four light-flux emitters 50 is inclined with respect to the surface 60 is pre-selected at a value which ensure that the parallel rays emitted from each emitter 50 are reflected substantially perpendicularly with respect to the surface 16 by a corresponding one of four base portions 60 (FIG. 4) of the outer surface of each solder ball 30 which face the respective light fluxes emitted from the four emitters 50, respectively, and each of which is adjacent to the surface 16. In addition, this angle is pre-selected at a value which does not cause each one of the solder balls 30 to shed its shadow on the respective outer surfaces of the other solder balls 30. Accordingly, when the EC 12 whose solder balls 30 are exposed to the four parallel-ray fluxes emitted from the four light-flux emitters 50 of the lighting device 40, is viewed by a person in a direction perpendicular to the surface 16, the person can see the solder balls 60 such that the four base portions 60 of the outer surface of each solder ball 60 are lighter than the remaining (i.e., central or top) portion of the same, as shown in FIG. 4. That is, the image taking device 42 can take an image of the EC 12 such that the respective central portions of the solder balls 30 and the surface 16 are darker than the four base portions 60 of each solder ball 30. Therefore, the outer peripheral edge line (i.e., bottom line) of each solder ball 30 can be determined with accuracy based on the respective images of the four light or bright base portions 60. Since the angle of each light base portion 60 with respect to the direction perpendicular to the surface 16 (i.e., the vertical direction) is small, the position of each base portion 60 in the direction parallel to the surface 16 does not change so largely when the distance of each base portion 60 from the surface 16 increases. Accordingly, the position of a portion of the outer peripheral edge line of each solder ball 30 which portion is defined by each base portion 60 can be determined with accuracy, which contributes to accurate determination of the position of each solder ball 30 in the direction parallel to the surface 16.

The EC holding device which is constructed as described above receives the ECs 12 from the EC supplying device at an EC receiving position, and mounts them on the PCB at an EC mounting position. The lighting device 40 and the image taking device 42 are provided between the EC receiving position and the EC mounting position. After position errors of each EC 12 which are determined by the control device based on the image of the EC 12 taken by the image taking device 42 are corrected by the control device, the EC 12 is mounted on the PCB.

When the EC 12 is received, first, the suction pipe 20 is positioned right above the EC 12 on the EC supplying device, and subsequently the elevating and lowering member is lowered for lowering the suction nozzle 10 and thereby causing the suction pipe 20 to contact the surface 18 of the EC 12. In this state, the suction pipe 20 is communicated with the vacuum source, so that the EC 12 is sucked and held by the suction pipe 20.

Then, the elevating and lowering member is elevated, and the movable member is moved, so that the suction pipe 20 is positioned right above the image taking device 42. In this state, the images of the solder balls 30 the EC 12 are taken by the image taking method as described below, and the positions of the solder balls 30 are determined by the position determining method as described below.

First, the four light-flux emitters 50 of the lighting device 40 emit the four fluxes of parallel rays toward the EC 12, so that the four base portions 60 of each of the solder balls 30 on the surface 16 of the EC 12 are exposed to the four fluxes, respectively, and the lights reflected by each solder ball 30 form an image of each solder ball 30 on the surfaces of the solid-state image pick-up elements of the image taking device 42. Thus, in the present embodiment, the lighting device 40 simultaneously lights all the solder balls 30 on the surface 16 of the EC 12, that is, the grid array of solder balls 30 as a whole, and the image taking device 42 simultaneously takes the image of the grid array of solder balls 30 as a whole. The image taking device 42 converts the thus taken image into gray-scale data or binary data, and supplies those data to the control device. The control device carries out a ball-position determining step in which the control device determines, based on the data received from the image taking device 42, the position of each solder ball 30 in a direction parallel to the surface 16. In addition, the control device carries out a EC-position determining step in which the control device determines, based on the thus determined positions of the solder balls 30, an X-direction and a Y-direction position of the center line (i.e., axis line) of the EC 12 held by the suction pipe 20 in an X direction and a Y direction which are perpendicular to each other and both of which is parallel to the surface 16 of the EC 12, and an angular or rotation position of the EC 12 about its center line perpendicular to the surface 16. Finally, the control device compares data indicative of the thus determined actual positions of the EC 12 with data indicative of reference positions of the EC 12 normally held by the suction pipe 20, and thereby determines X-direction and Y-direction position errors of the center line of the EC 12 and a rotation-position error of the EC 12 about its center line.

After the position errors of the EC 12 are determined, the suction nozzle 10 holding the EC 12 is moved to, and stopped at, the EC mounting position. The X-direction and Y-direction position errors of the center line of the EC 12 are eliminated by correcting, according to those errors, the EC mounting position in the X and Y directions, so that the suction nozzle 10 is stopped at the corrected EC mounting position. In addition, the rotation-position error of the EC 12 about its center line is eliminated by rotating, according to that error, the EC mounting head about its axis line. Thus, in the state in which the suction pipe 20 is positioned at the EC mounting position, the EC 12 is correctly positioned relative to the PCB. Then, the elevating and lowering member is lowered, the EC 12 held by the suction pipe 20 is pressed against the prescribed position on the PCB, so that the EC 12 is temporarily fixed to the PCB with the solder paste or flux present on the PCB. In this state, the solenoid-operated switch valve is switched for communicating the suction pipe 20 with the atmosphere, so that the EC 12 is released from the suction pipe 20. Subsequently, the suction pipe 20 is elevated, and the EC 12 is left on the PCB. Thus, the mounting of the EC 12 on the PCB is finished.

In the present embodiment, the image taking device 42 can take an image of each solder ball 30 which suffices for determining or identifying the outer peripheral edge line of the ball 30, and the control device can accurately determine the position of each ball 30 based on the identified edge line thereof. Thus, the EC mounting device can mount the EC 12 at the prescribed position on the PCB with improved accuracy. In addition, since the image taking device 42 simultaneously takes the respective images of the number of solder balls 30, the image taking system 44 enjoys improved efficiency of taking of images.

Figure 6:
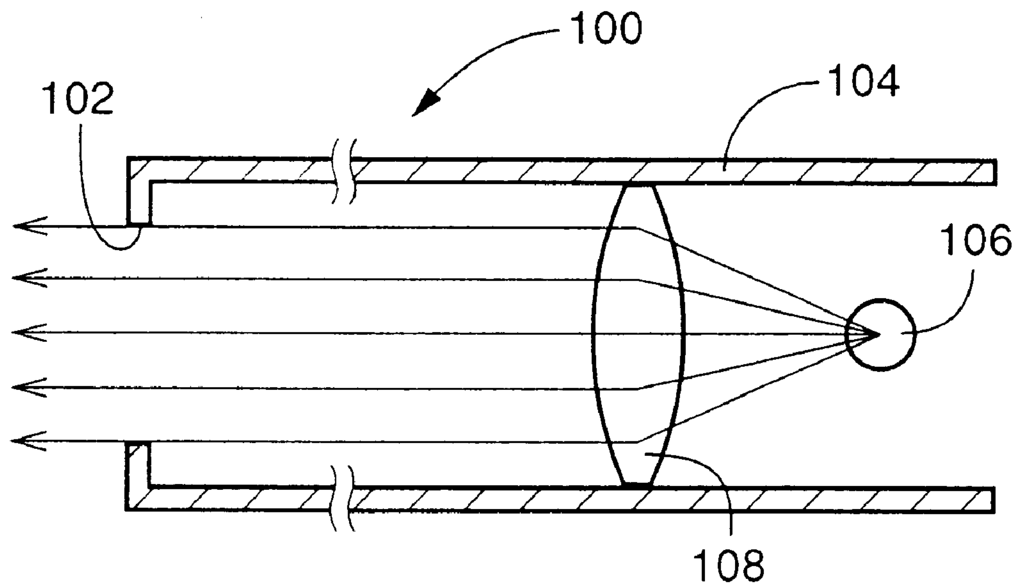
FIG. 6 is a cross-sectioned, front elevation view of an essential portion of a lighting device of another image taking system as a second embodiment of the present invention.
Figure 7:
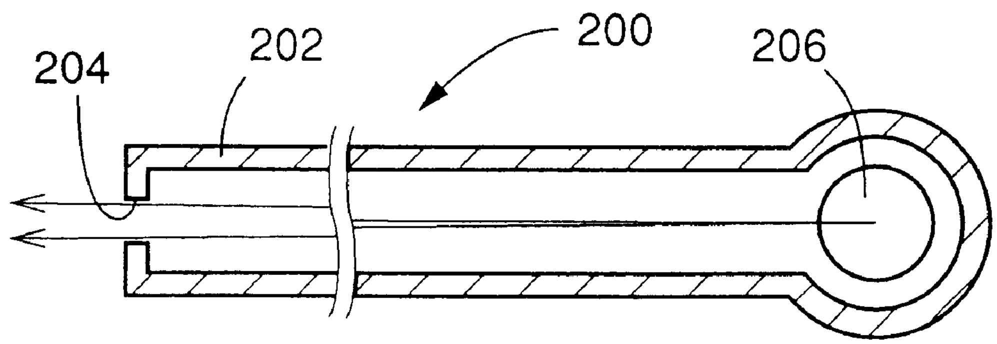
FIG. 7 is a cross-sectioned, front elevation view of an essential portion of a lighting device of another image taking system as a third embodiment of the present invention.
Figure 8:
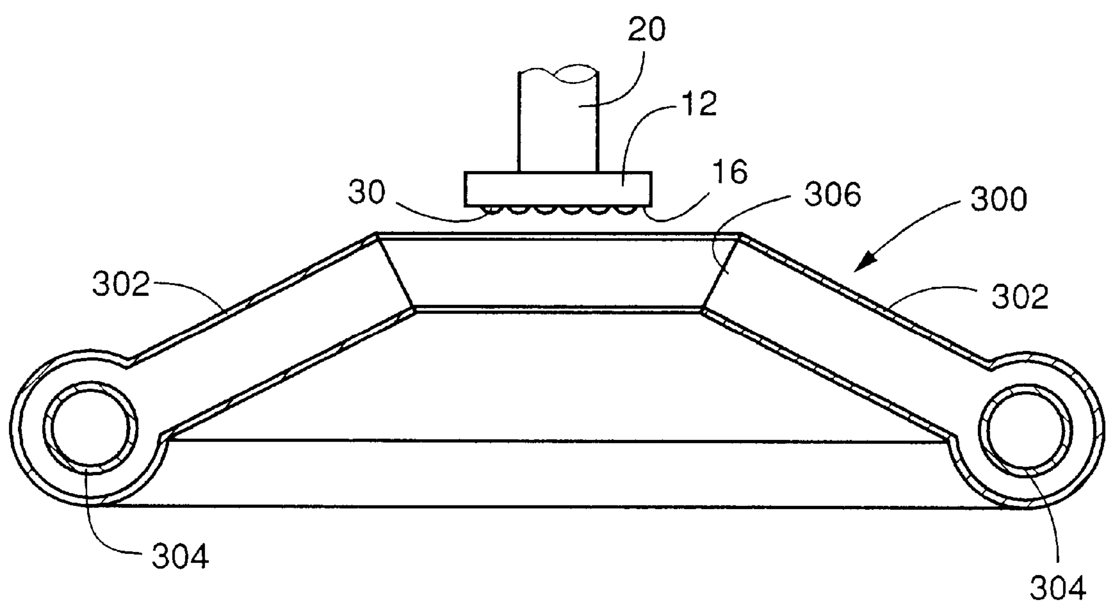
FIG. 8 is a cross-sectioned, front elevation view of an essential portion of a lighting device of another image taking system as a fourth embodiment of the present invention.

Each of the four flux-light emitters 50 of the lighting device 40 for simultaneously lighting the plurality of solder balls 30 may be replaced by either one of the following light-flux emitters 100, 200 shown in FIGS. 6 and 7, respectively, and all the four flux-light emitters 50 of the lighting device 40 may be replaced by a single lighting device 300 shown in FIG. 8.

The light-flux emitter 100 shown in FIG. 6 includes a light-guide tube 104 which has a rectangular cross section, and a slit 102 in the vicinity of its outlet; a linear light source 106 which is provided in the light-guide tube 104; and a lens 108 which is provided between the light source 106 and the slit 102. The rays radially emitted from the light source 106 are converted by the lens 108 into a flux of parallel rays, which pass through the slit 102 toward the EC 12.

The light emitter 200 shown in FIG. 7 includes a light-guide tube 202 which has a rectangular cross section, an elongate shape, and a slit 204 in the vicinity of its outlet; and a linear light source 206 which is provided in the light-guide tube 202 at a position distant from the slit 204. Although the light source 206 radially emits rays, the light emitter 200 emits only a flux of substantially parallel rays through the slit 204 toward the EC 12.

Like each flux-light emitter 50, the light-flux emitters 200, 300 shown in FIGS. 6 and 7 are examples of the flat-light-flux emitter.

The lighting device 300 shown in FIG. 8 is an example of a conical-tubular-light-flux emitter. The lighting device 300 includes a light-guide tube 302 which has a hollow, truncated conical tubular shape which is delimited by a first cone whose center line is perpendicular to the surface 16 of the EC 12 and by a second cone parallel to the first cone. The second cone is obtained by translating the first cone in a direction parallel to the center line thereof. A ring light 304 is provided in the light-guide tube 302, and the tube 302 has an annular slit 306 in the vicinity of its outlet. The lighting device 300 emits a conical-tubular light flux including a plurality of rays which are parallel to a pluralist of generators of the first cone, respectively. The lighting device 300 is provided such that the annular slit 306 as an annular light emitting plane concentrically surrounds the EC 12. It can be said that the present lighting device 300 is obtained by infinitely increasing the number of the flat-light-flux emitters 50, 100, 200, i.e., the number of the directions in which the flat light fluxes are emitted toward the EC 12.

Furthermore, the lighting device 40 may be replaced by an optical-fiber lighting device including a casing, a plurality of optical fibers which are provided in the casing, a light source which emits rays which are transmitted by the optical fibers such that parallel rays are emitted toward the EC 12.

While the present invention has been described in its preferred embodiments, it is to be understood that the present invention may be otherwise embodied.

In the first to fourth embodiments shown in FIGS. 1 to 5, FIG. 6, and FIG. 7, and FIG. 8, the four light-flux emitters 50, 100, 200 or the single light-flux emitter 300 emit or emits the fluxes or flux of rays toward the EC 12 in the respective directions or direction which are or is inclined with respect to the surface 16 of the EC 12. However, for example, in the case where the image of a single projection which projects from a plane is taken, a lighting device may emit a light toward the projection in a direction parallel to the plane. In the latter case, too, the light emitters 50, 100, 200, 300 may be employed.

In the first to third embodiments, the four light-flux emitters 50, 100, 200 are employed for emitting the respective fluxes of light toward the EC 12 in the four directions. However, the number of the light-flux emitters 50, 100, 200 may be changed to three or five or more. In the latter case, the three or five or more light-flux emitters emit respective fluxes of lights toward the EC 12 in three or five or more directions (as viewed in a direction parallel to the axis line of each solder ball 30) which pass through the axis line and three or five or more points which equally divide a circle whose center rides on the axis line. In this case, too, three or five or more base portions 60 of the outer surface of each ball 30 are seen lighter or brighter than the remaining portion of the outer surface of the same 30 as viewed in the direction parallel to the axis line of the ball 30. Thus, the image of the EC 12 taken by the image taking device 42 clearly distinguished the outer peripheral edge line of each solder ball 30 from the surface 16 of the EC 12, and the control device can determine, based on the taken image, the outer peripheral edge line of each ball 30. It is not essentially required that the three or more light-flux emitters 50, 100, 200 be equiangularly spaced from one another about the axis line of the EC 12.

It is possible that the directions in which the respective fluxes of parallel rays are emitted toward the EC 12 be inclined, as viewed in the direction perpendicular to the surface or plane 16 of the EC 12, with respect to both the first group of straight parallel lines and the second group of straight parallel lines which cooperate with each other to define the grid points on the plane 16 of the EC 12. In this case, if the angle of inclination of the light-emitting direction of the lighting device 40, 100, 200, 300 with respect to the plane 16 of the EC 12 is decreased, each of the solder balls 30 is effectively prevented from shedding its shadow on the outer surface or surfaces of another or other solder balls 30, and the light emitted from the lighting device 40, 100, 200, 300 is reflected perpendicularly with respect to the plane 16 of the EC 12 from a portion of the outer surface of each ball 30 which portion is more proximate to the outer peripheral edge line of the same 30. Thus, the image of that portion of each solder ball or projection 30 can be obtained.

In the illustrated embodiments, the suction nozzle 10 is movable in the X and Y directions parallel to the plane 16 of the EC 12, and in the vertical direction, i.e., Z direction perpendicular to the X and Y directions, whereas the PCB is not movable. However, the present invention may be applied to such a EC holding device wherein the suction nozzle 10 is movable in the X direction and the Z direction whereas a circuit substrate such as a PCB is movable in the Y direction. Alternatively, the present invention may be applied to such an EC mounting device wherein a circuit substrate is movable in the X and Y directions whereas the suction nozzle 10 is revolvable around an axis line and is stoppable at a predetermined position where the nozzle 10 is movable in the Z direction only. Generally, the present invention is applicable to those mounting devices wherein a suction nozzle and a circuit substrate are movable relative to each other for mounting a circuit component on the circuit substrate.

The present invention is also applicable to the case where a reference mark as a convex or part-spherical projection projects from a PCB as an example of a circuit substrate as a member of an electric circuit. The position errors of the PCB positioned by the PCB positioning device can be determined based on the images of a plurality of reference marks provided on the PCB. Those images are taken by another image taking device. In this case, since not only the position errors of the EC 12 held by the suction nozzle 10 but also the position errors of the PCB positioned by the PCB positioning device are corrected, the EC 12 can be mounted at its prescribed position on the PCB with higher accuracy.

It is to be understood that the present invention may be embodied with other changes, improvements, and modifications that may occur to those skilled in the art without departing from the scope and spirit of the invention defined in the appended claims.

What is claimed is:

1. A method of determining a position, in a direction parallel to a plane surface, of a convex projection which projects from the plane surface and whose outer surface has a gloss, comprising the steps of:

emitting, toward the outer surface of the convex projection and the plane surface, a plurality of lights in a plurality of directions, respectively, which differ from each other as viewed in a direction perpendicular to the plane surface and each of which takes a predetermined common angle with respect to the plane surface, so that a plurality of base portions of the outer surface of the convex projection which face the plurality of lights, respectively, and each of which is adjacent to the plane surface are lighter than a remaining portion of the outer surface and the plane surface as viewed in the direction perpendicular to the plane surface, taking, using an image taking device, an image of the convex projection and the plane surface as viewed in the direction perpendicular to the plane surface, and determining the position of the convex projection in the direction parallel to the plane surface, based on an outer peripheral edge line of the convex projection that defines, in the taken image, a boundary between the outer surface of the convex projection and the plane surface.

2. A method according to claim 1, wherein each of the plurality of directions is inclined with respect to the plane surface.

3. A method according to claim 1, wherein each of the plurality of directions is parallel to the plane surface.

4. A method according to claim 1, wherein the plane surface comprises a surface of a member of an electric circuit, and wherein the convex projection comprises a solder projection which is formed on the surface of the member.

5. A method according to claim 4, wherein the member of the electric circuit comprises a circuit substrate, and wherein the solder projection comprises at least one reference mark formed on a surface of the circuit substrate.

6. A method according to claim 1, wherein a plurality of said convex projections are formed on the plane surface such that the convex projections are separate from each other, wherein each of the plurality of lights comprises parallel rays, wherein the step of emitting the plurality of lights comprises simultaneously emitting the plurality of lights each of which comprises the parallel rays, toward at least two convex projections of the plurality of convex projections, and wherein the step of taking the image of the convex projection comprises taking respective images of the at least two convex projections.

7. A method according to claim 6, wherein the plurality of convex projections are formed at a plurality of grid points, respectively, which are defined as points of intersection at which a first group of straight parallel lines and a second group of straight parallel lines perpendicularly intersect each other on the plane surface, and wherein each of the plurality of directions is inclined with respect to the straight parallel lines of each of the first and second groups as viewed in the direction perpendicular to the plane surface.

8. A method according to claim 6, wherein each of the plurality of directions is inclined with respect to the plane surface by a pre-selected angle which does not cause each one of the at least two convex projections to shed a shadow thereof on the outer surface of the other convex projection.

9. A method according to claim 6, wherein the plurality of convex projections comprises a grid array of solder balls formed on a back surface of a flip chip.

10. A method of determining, based on the position of the convex projection determined by the method according to claim 1, a position where a circuit component having the convex projection is held by a suction nozzle.

11. A system for determining a position, in a direction parallel to a plane surface, of a convex projection which projects from the plane surface and whose outer surface has a gloss, comprising:

a lighting device which emits, toward the outer surface of the convex projection and the plane surface, a plurality of lights in a plurality of directions, respectively, which differ from each other as viewed in a direction perpendicular to the plane surface and each of which takes a predetermined common angle with respect to the plane surface, so that each of the plurality of lights is reflected perpendicularly with respect to the plane surface by a corresponding one of a plurality of base portions of the outer surface of the convex projection which face the plurality of lights, respectively, and each of which is adjacent to the plane surface;

an image taking device which takes the image of the convex projection and the plane surface as viewed in the direction perpendicular to the plane surface; and means for determining the position of the convex projection in the direction parallel to the plane surface, based on an outer peripheral edge line of the convex projection that defines, in the taken image, a boundary between the outer surface of the convex projection and the plane surface.

12. A system according to claim 11, wherein each of the plurality of directions is inclined with respect to the plane by an angle which assures that said each light is reflected perpendicularly with respect to the plane by said corresponding one base portion of the outer surface of the convex projection.

13. A system according to claim 11, wherein each of the plurality of directions is parallel to the plane surface, so that said each light is reflected perpendicularly with respect to the plane surface by said corresponding one base portion of the outer surface of the convex projection.

14. A system according to claim 11, wherein the lighting device comprises at least three flat-light-flux emitters each of which emits a flat light flux comprising parallel rays and which are provided around a normal of the plane surface such that each of the flat-light-flux emitters is inclined with respect to the plane surface.

15. A system according to claim 14, wherein the lighting device comprises four said flat-light-flux emitters.

16. A system according to claim 11, wherein the lighting device comprises a conical-tubular-light-flux emitter which emits a conical-tubular light flux which is delimited by a first cone whose center line is perpendicular to the plane and by a second cone parallel to the first cone, the conical-tubular light flux comprising a plurality of rays parallel to a plurality of generators of the first cone, respectively.

17. A method of determining a position, in a direction parallel to a plane surface, of a convex projection which projects from the plane surface and whose outer surface has a gloss, comprising the steps of:

emitting, toward the outer surface of the convex projection and the plane surface, a plurality of lights in a plurality of directions, respectively, which differ from each other as viewed in a direction perpendicular to the plane surface and each of which takes a predetermined common angle with respect to the plane surface, so that a plurality of base portions of the outer surface of the convex projection which face the plurality of lights, respectively, and each of which is adjacent to the plane surface are lighter than a remaining portion of the outer surface and the plane surface as viewed in the direction perpendicular to the plane surface, wherein the convex projection does not receive any lights emitted at any angles different from the predetermined common angle, taking, using an image taking device, an image of the convex projection and the plane surface as viewed in the direction perpendicular to the plane surface, and determining the position of the convex projection in the direction parallel to the plane surface, based on an outer peripheral edge line of the convex projection that defines, in the taken image, a boundary between the outer surface of the convex projection and the plane surface.

* * * * *